Figure 1:
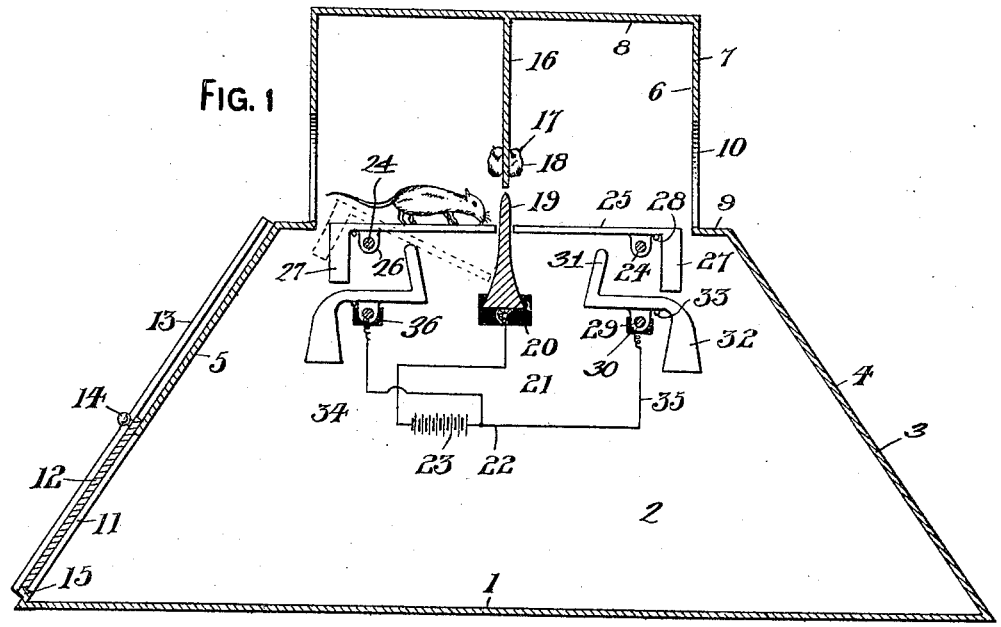

K. STEFÁN.
ELECTRIC RAT TRAP.
APPLICATION FILED JULY 24, 1911.

1,006,887.

Patented Oct. 24, 1911.

WITNESSES:

INVENTOR.
K. Stefán
BY
ATTORNEYS

UNITED STATES PATENT OFFICE.

KÁROLY STEFÁN, OF WEST PHILADELPHIA, PENNSYLVANIA.

ELECTRIC RAT-TRAP.

1,006,887.   Specification of Letters Patent.   Patented Oct. 24, 1911.

Application filed July 24, 1911. Serial No. 640,224.

*To all whom it may concern:*

Be it known that I, KÁROLY STEFÁN, a subject of the King of Hungary, residing at West Philadelphia, in the county of Philadelphia and State of Pennsylvania, have invented certain new and useful Improvements in Electric Rat-Traps, of which the following is a specification, reference being had therein to the accompanying drawing.

This invention relates to electric rat traps, and more particularly to that type of trap wherein tiltable platforms and a source of electrical energy are utilized for electrocuting and entrapping a rodent.

The object of my invention is to provide a simple and durable trap that can be safely used to an advantage in stores and other buildings infested with rodents, for entrapping and electrocuting rats, the trap being constructed whereby the bodies of the rodents will be placed out of sight of other rodents and collected to be removed from time to time.

I attain the above objects by a mechanical construction that will be hereinafter specifically described and then claimed, and reference will now be had to the drawing, wherein:—

Figure 2:
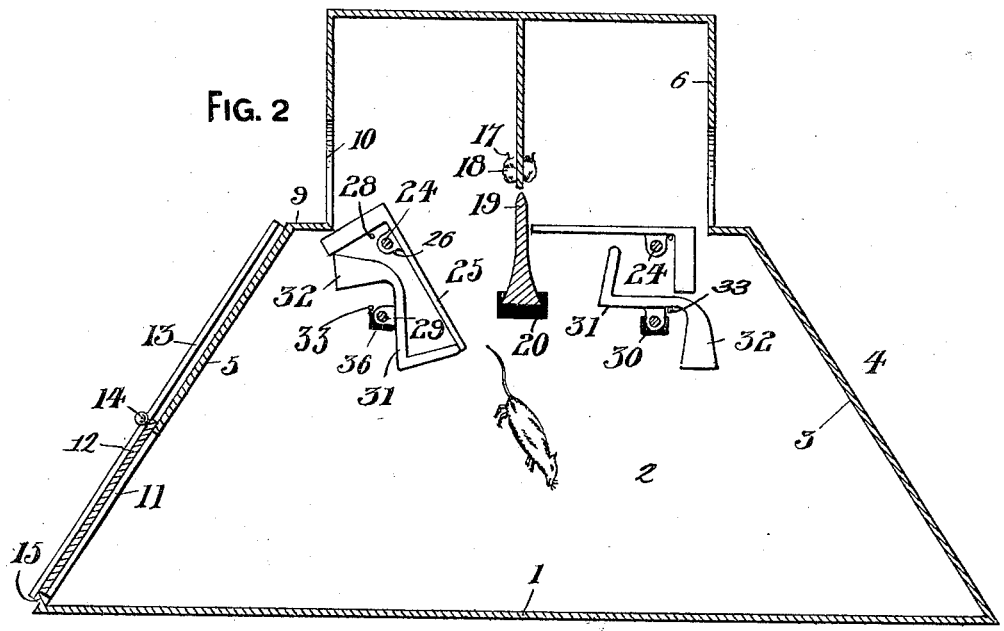

Figure 1 is a longitudinal sectional view of the trap, showing the tiltable platforms in their normal position, and Fig. 2 is a similar view showing one of the platforms tilted.

A trap in accordance with this invention comprises a bottom plate 1 and vertical side walls 2, the side walls having the edges thereof beveled, as at 3 to accommodate inclined end walls 4 and 5, and the upper ends of the side walls are reduced or cut away, as at 6 to receive vertical end walls 7, said walls supporting a top plate 8. The vertical end walls 7 have the lower edges thereof engaging transverse platforms 9 supported by the side walls 2 and the inclined end walls 4 and 5, these platforms providing a footing for a rat prior to entering openings 10 in the vertical end walls 7. The inclined end wall 5 has the lower end thereof provided with a doorway 11 normally closed by a slide or door 12, said slide or door being arranged in guides 13, carried by the side edges of the inclined end wall 5. The upper edge of the slide or door 12 has a knob 14 to facilitate opening the same and said slide or door is limited in its closing movement by a transverse ledge or lip 15, carried by the lower edge of the inclined end wall 5.

The bottom plate 1, walls 2, 4 and 5 provide a casing and the walls 2 coöperate with the vertical end walls 7 and the top 8 in providing a housing upon the casing. Supported by the inclined sides of the walls 2, within the housing is a transverse partition 16 having hooks or holders 17 for pieces of bait 18.

Arranged between the side walls 2, directly beneath the partition 16 is a wedge-shaped electrode 19 and between the ends of this holder and the side walls 2 are plates of insulation 20. The electrode 19 is stationary and is connected by wires 21 and 22 to a suitable source of electrical energy, as batteries 23.

Arranged transversely of the trap, adjacent to the inner edges of the platforms 9 and at a point removed from the horizontal plane of said platforms, are pivot rods 24 for tiltable platforms 25, said platforms having depending bearings 26 loosely mounted upon the rods 24. The inner edges of the tiltable platforms 25 are in proximity to the transverse electrode 19, the sides of said electrode being tapered or curved to provide clearance for a swinging movement of the inner edges of said platforms. The outer edges of the tiltable platforms 25 are in proximity to the inner edges of the platforms 9 and are provided with depending enlargements or weights 27 adapted to normally maintain the tiltable platforms in a horizontal position, representing a continuation of the stationary transverse platforms 9. The platforms 25 are held by inwardly projecting pins 28, carried by the side walls 2, these pins limiting the movement of the platforms in one direction.

Arranged transversely of the trap, directly beneath the rods 24, is another set of rods 29 and pivotally connected upon these rods are the bearings 30 of tiltable Z-shaped electrodes 31. These electrodes have the lower ends thereof weighted or enlarged, as at 32 and said electrodes are normally supported in a horizontal position by inwardly projecting pins 33 carried by the side walls 2. The electrodes 31 are in circuit with the batteries 23 by wires 34 and 35 connected to the rods 29, and the ends of the rods are mounted in blocks of insulation 36, carried by the walls 2.

The weight of a rodent's body upon the inner edge of one of the tiltable platforms 25 is adapted to overbalance the platform and precipitate the rodent against the electrode 19. As the platform 25 is tilted, it contacts with the upper end of the tiltable electrode 31 and through the medium of a rodent's body, completes a circuit that charges the body and eventually electrocutes it before the rodent is deposited into the casing of the trap. Immediately upon the tiltable platform being free of the weight of the rodent's body, the tiltable platform 25 and the tiltable electrode 31 are restored to their normal position, breaking the circuit and placing the trap in condition to receive another rodent.

From the foregoing it will be observed that the trap comprises a casing having an open top with tiltable platforms adapted to be placed in engagement with tiltable electrodes by the weight of a rodent, the top of the casing having a suitable housing containing a bait. As suitable insulation is provided for the electrodes, the remainder of the trap can be made of metal or any other durable material.

What I claim is:—

An electric rat trap comprising a casing, an electrode arranged transversely thereof and in circuit with a suitable source of electrical energy, tiltable platforms arranged in the top of said casing with the inner edges thereof in proximity to said electrode, and tiltable electrodes arranged beneath said platforms and in circuit with the same source of electric energy as said transverse electrode and adapted to be engaged by said tiltable platforms whereby a circuit will be completed by a rodent's body connecting said platforms and said transverse electrode.

In testimony whereof I affix my signature in the presence of two witnesses.

KÁROLY STEFÁN.

Witnesses:
Jos. Mayer,
H. Mühlschlegel.